United States Patent [19]
Hildebrand

[11] 3,883,432
[45] May 13, 1975

[54] SYSTEM FOR PURIFYING AND DISINFECTING WASTE WATER

[76] Inventor: Karl-Heinz Hildebrand, Fachbachtal 40, 5421 Fachbach Bad-Ems, Germany

[22] Filed: Sept. 13, 1973

[21] Appl. No.: 396,741

Related U.S. Application Data

[63] Continuation of Ser. No. 172,351, Aug. 12, 1971, abandoned.

[30] Foreign Application Priority Data

Aug. 12, 1970 Germany............................ 2040061

[52] U.S. Cl. ................. 210/152; 210/195; 210/202; 210/206; 210/208
[51] Int. Cl............................................. B01d 21/16
[58] Field of Search ........... 210/152, 195, 199, 202, 210/206, 208, 219, 265

[56] References Cited
UNITED STATES PATENTS

| | | | |
|---|---|---|---|
| 1,505,104 | 8/1924 | Moeak............................ | 210/206 X |
| 3,313,725 | 4/1967 | Tsuda et al...................... | 210/195 X |
| 3,434,598 | 3/1969 | Daman........................... | 210/219 X |
| 3,444,077 | 3/1969 | Finch............................. | 210/265 X |
| 3,480,543 | 11/1969 | Hildebrand..................... | 210/152 |
| 3,541,594 | 11/1970 | Wallace.......................... | 210/152 X |
| 3,577,341 | 5/1971 | Keith, Jr. et al................. | 210/202 X |
| 3,637,487 | 1/1972 | Kemmer et al.................. | 210/195 X |
| 3,651,944 | 3/1972 | Shuttleworth.................... | 210/265 |
| 3,664,951 | 5/1972 | Armstrong...................... | 210/195 X |

*Primary Examiner*—John Adee
*Attorney, Agent, or Firm*—Dorsey, Marquart, Windhorst, West & Halladay

[57] ABSTRACT

A system for purifying and disinfecting waste water including container housing a disintegrating pump, a mixing vessel downstream from said container, and a closed vessel downstream from said mixing vessel, said closed vessel housing a filter device and means for introducing a controlled amount of chemicals into the waste water.

8 Claims, 1 Drawing Figure

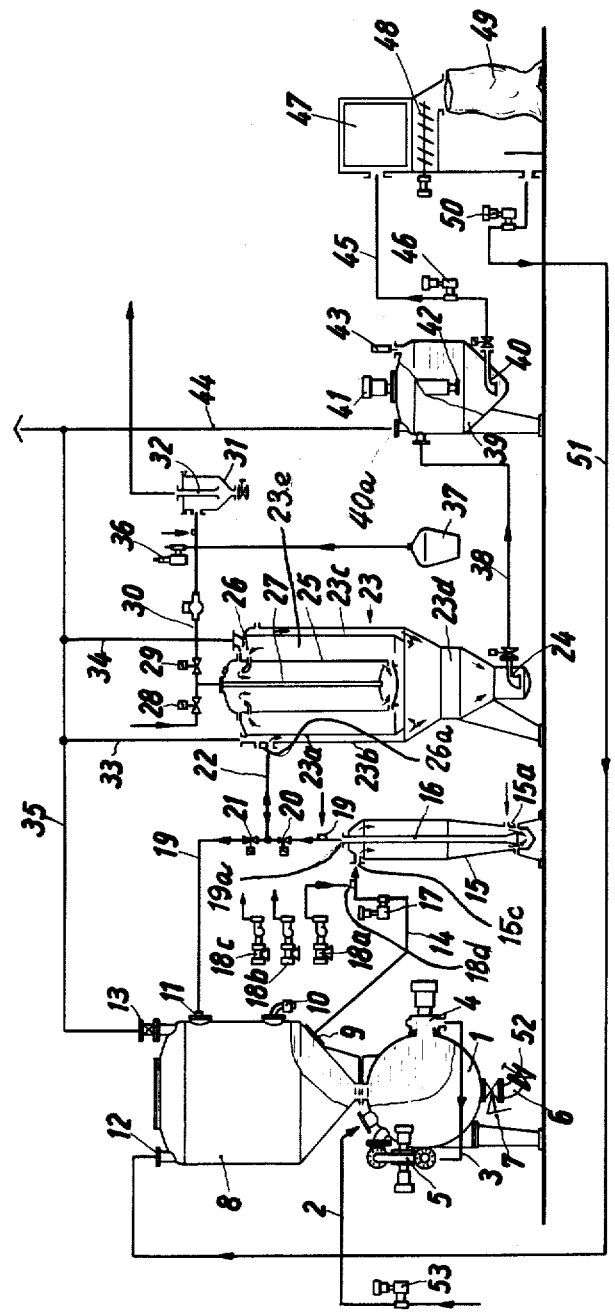

SYSTEM FOR PURIFYING AND DISINFECTING WASTE WATER

This application is a continuation of U.S. Pat. application Ser. No. 172,351, filed Aug. 12, 1971, now abandoned.

BACKGROUND OF THE INVENTION

This invention relates generally to a system for cleaning and disinfecting waste water, and more particularly to a system for cleaning and disinfecting waste water in hospitals and on ships.

In such systems it is required that a high percentage of the germs found in the waste water be destroyed. For accomplishing this requirement, disinfecting systems are known which disinfect the waste water thermally by heating the water to a temperature sufficiently high to sterilize the water. These systems have the disadvantage next to the high energy and operative expense that the heating of the waste water requires a corresponding retention time in the boilers and thereby only low quantities of waste water can be disinfected or, on the other hand, very large systems are needed.

Further disinfecting systems are old which disinfect waste water chemically. These systems have the disadvantage that the waste water can be processed only in charges and the destroying of the germs is accomplished only with comparatively high dosages of a disinfecting agent as a result of the high concentration of contaminations and suspended material in the waste water of hospitals and ships. Also, the waste water leaves these systems unpurified.

SUMMARY OF THE INVENTION

In contrast to the cleaning and disinfecting systems of the past, the present invention is designed to solve the problem of providing a system which continuously processes the waste water with small disinfecting agent dosages and produces pure water. According to the present invention, a mixing vessel is provided downstream from a container having a disintegrating device, the mixing vessel containing an inlet and an outlet for the waste water and at least one inlet for chemicals. Disposed downstream from the mixing vessel is a closed vessel having an inlet and an outlet for the waste water, a sludge drain, and a filter device. The outlet line of the closed vessel contains a disinfecting apparatus. The container can open into a reservoir upwardly, the inlet of the downstream mixing vessel can be connected to the reservoir, and the container can have a spherical bottom with a draining device. Furthermore, the container can be provided with a line returning to the container in which in series a pump and a disintegrating device are installed, and the pump can be of such a type that it disintegrates solid objects during pumping. Preferably it is proposed that the mixing vessel have an annular cylindrical space with an upper tangential inlet which is connected at the bottom with a central space. The central space has an upper outlet and an inlet for chemicals. The inlet and the outlet of the mixing vessel are each connected to a dosage device for a chemical agent. Advantageously the filter is installed in the vessel in such a way that when cleaning the filter the return sludge of the filter is passed into the sludge drain of the vessel by flowing water through the filter in a reverse direction. Furthermore the vessel can have a downwardly open outer annular space with a tangential inlet, and in the sludge drain line a device can be installed for disinfecting and dewatering the sludge.

Accordingly it is an object of the present invention to provide a system for purifying and disinfecting waste water with small disinfecting agent dosages.

Another object of the present invention is to provide an improved system for continuously processing waste water.

These and other objects of the present invention will become apparent with reference to the drawing, the description of the preferred embodiment, and to the appended claims.

DESCRIPTION OF THE DRAWING

The drawing of the system of the present invention is a partially schematic view of a flow diagram illustrating the various components of the present invention.

DESCRIPTION OF THE PREFERRED EMBODIMENT

The system of the present invention has a preferably spherical container or first mixing tank 1 with an inlet for the waste water or sewage, designated by the line 2. The container 1 also includes a feedback line 3, one end of which is connected to the container 1 through a sewage discharge and a pump 4 and the other end of which is connected to the container 1 through a disintegrator 5. The container 1 also includes a lower outlet or drain 6 capable of being shut off by an appropriate valve 7. The container 1 at the top opens into a larger reservoir 8 which in its lower portion has an sewage outlet 9 and thereabove an electrical switch 10 sensitive to water pressure. Contained within the upper portion of the reservoir 8 are a pair of inlets 11 and 12 and a venting line 13. The mixing tank 1 is adapted for thoroughly mixing or homogenizing the sewage introduced therein.

The system furthermore has a vertical substantially cylindrical mixing container or second mixing tank 15 with a central vertical pipe 16 extending almost all the way to the bottom of the container. The upper portion of the mixing container 15 is connected through a line 14 which extends from the outlet 9 of the reservoir 8 to the sewage inlet 15c of the container 15. In the line 14, there is a pump 17. An outlet 18d of a dosage device 18a is designed to open into the line 14 thus providing an inlet for introducing chemicals such as an alkaline agent into the waste water. The outlet 15a of a second dosage device 18b is provided in the lower portion of the mixing container 15. Through this outlet the waste water is treated with an agent which reduces the pH of the alkaline water. The pipe 16 is connected to the line 19 at the sewage outlet 19a. In the line 19 two valves 20 and 21 are installed. Downstream of the last valve 21 the line passes to the inlet 11 of the reservoir 8. The outlet of a third dosage device 18c opens into the line 19 between the mixing vessel 15 and the valve 20, and introduces a sedimentation agent into the waste water.

A line 22 branches off between the two valves 20 and 21 and opens tangentially at an upper tangential inlet 26a into an outer cylindrical annular space or chamber 23a of a closed vessel 23. The annular space 23a is disposed between the outer portion of the upper cylindrical housing section 23b and a cylindrical wall 23c, and it extends to a point at which the housing 23b converges inwardly. At the lower end of the converging portion of the housing 23b of the closed vessel 23 a drain device 24 for dredge is provided. Located immediately to the inside of the wall 23c is an inner annular chamber 23e. As is evident from the drawing, the outer annular chamber 23a is open at its bottom end and in communication with the chamber 23e. Both the outer and inner annular chambers, 23a and 23e respectively, are in communication with a third chamber positioned immediately therebelow. In the upper cylindrical housing section 23b spaced inwardly from the cylindrical wall 23c is inserted a cylindrical filter insert 25 which is in communication with the space between the filter insert 25 and the cylindrical wall 23c by a plurality of inlets 26. As is evident, the filter element 25 is arranged downstream from the upper tangential inlet 26a. A central pipe 27 extends to the vicinity of the bottom of the filter insert, and is there enlarged in such a way that filter mass filling the free interior of the filter insert 25 for the major portion of its height cannot intrude in the pipe 27. Material suited for the mechanical purification of water can be used as filter material, for instance gravel, coal, activated charcoal, semifired dolomite. Both the space 23a and the space 23e between the wall 23c and the filter insert 25 are connected through lines 33 and 34 with an aeration and venting line 35. The venting line 35 is in turn connected to the venting line 13 contained in the reservoir 8.

The pipe 27 which serves as an outlet opens into a line 30 between two valves 28 and 29. The portion of the line 30 on the upstream side of valve 28 leads from a fresh water line and the portion of the line on the downstream side of valve 29 leads to a mixing container or disinfecting means 31 the outlet of which is connected to a central pipe 38. It should be noted that the disinfecting means 31 is positioned downstream from the filter 25. Opening into the line 30 is an outlet of a clorine dosage device 36 which is connected to a reservoir 37. The water leaving the pipe 32 can be utilized as disinfected water.

The sludge outlet 24 of the closed vessel 23 is connected through a line 38 to a third mixing tank or container 39 which has at its lower conical end a sludge drain or outlet 40, and which has in its central portion a mixing blade 42 rotatably driven by a motor 41, a central inlet for air and a clorine dosage device 43. A line 44 connects the interior of the mixing container 39 to the aeration and venting line 35. The sludge drain 40 is connected through a line 45 in which a feed pump 46 is installed to a sludge thickener or densifier 47 in which the sludge is dewatered to such an extent that it can be filled into bags 49 as a humid solid material by means of a conveying apparatus 48. Leading from the sludge thickener is a line 51 for conveying the filtered off water to the inlet 12 of the reservoir 8. An appropriate pump 50 is provided in the line 51 to effect such conveyance.

The overall operation of the system can be explained as follows: First of all, the waste water is pumped by a drain water pump 53 in pulses through the inlet 2 into the container 1. In this regard, it is pumped in pulses through the pump 4 from the one side of the container 1 through the line 3 to the other side of the container. The pump 4 is of such a type that it disintegrates solids of a coarser nature carried along in the waste water, for instance paper and sanitary towels, to a certain extent, while the disintegrator 5 finely disintegrates this material. Heavy parts not capable of being disintegrated such as stones, metal pieces etc., immediately drop to the bottom of the spherical container 1 and can be discharged by opening the valve 7 in the outlet 6. These objects are then collected in the area between the valve 7 and a further valve 52. After the valve 7 is closed, the valve 52 can then be opened and the stones, metal object, etc. can be removed. Thus the valve 52 acts as a stone lock.

As soon as the waste water with the disintegrated solids coming from the container 1 to the reservoir 8 has reached a certain height, the switch 10 is actuated as a result of the water pressure to thereby cause the outlet 9 to be opened until the water pressure acting upon the switch 10 drops below a certain limit. The waste water which is homogenized in container 1 is then pumped by pump 17 through the line 14 into the mixing vessel 15 through the sewage inlet 15a. In flowing through the line 14, an amount of an alkaline agent (for instance lime milk) is added thereto by the dosage device 18a, through the dosage outlet 18d, which corresponds to the quantity of water conveyed by pump 17 and causes a deflocculation of the contaminations which are capable of being deflocculated by an alkalinization.

When an agent (for instance iron chlorides) has been added to the waste water at the lower end of the mixing container by the second dosage device 18b through the dosage outlet 15a for lowering the pH of the alkaline water, thus causing a deflocculating of the substances which do not defloculate by alkaline agents, it rises in pipe 16, through the outlet 19a and is blended in line 19 through the third dosage device 18c with a sedimentation agent (for instance cellulose derivates).

The waste water then flows through the valve 20, the line 22, the inlet 26a into the cylindrical annular space 23a of the closed vessel 23. In the cylindrical annular space 23a the waste water moves downwardly rotating, decelerates and separates in the lower portion 23d from dirt particles. Thereafter it rises upwardly in the annular chamber 23e between the cylindrical wall 23c and the cylindrical filter insert 25, and flows through the inlets 26 into filter 25 and is forced through pipe 27, valve 29 and line 30 into the mixing container 31 and through pipe 32 thereof. Upstream of the mixing container the waste water is injected with chlorine by means of a chlorine dosage device. The waste water which has now been disinfected and clarified leaves through pipe 32.

To clean the filter 25, fresh water is forced through the valve 28 and the pipe 27 into the filter 25. The return sludge contained in the filter 25 is thus flooded into the lower portion 23d of the closed vessel 23. The fesh water is also forced through line 22, valve 21 and line 19 into reservoir 8.

The sludge forming in the lower portion 23d is discharged in pulses through the sludge drain 40 and the line 38 into mixing container 39. There it is mixed with air, is blended with chlorine abruptly and thereafter is supplied through the pump 46 to the sludge thickener 47. The filter water resulting in the sludge thickener 47 is returned to the reservoir 8 through a line 51 which is provided with a pump 50. The thickened sludge is filled into bags 49 by means of a conveying apparatus 48. If the sludge is thereafter burned, a chlorination of the sludge in the mixing container 39 is not necessary.

Although the description of the preferred embodiment of the present invention has been quite detailed, it is contemplated that various changes could be made without deviating from the teachings or the spirit of the present invention. It is therefore intended that the scope of the present invention be dictated by the appended claims and their equivalents rather than by the description of the preferred embodiment.

I claim:

1. A system for the continuous purification and disinfection of sewage comprising:
   a first mixing tank for homogenizing the sewage, said first mixing tank having a sewage inlet, a drain for solid substances which collect on the bottom of said first mixing tank and a sewage discharge leading to a feed back line returning to said first mixing tank and wherein a pump and a disintegrating means are arranged in said line, said first mixing tank including a reservoir positioned thereabove and wherein a sewage outlet is located;
   a second mixing tank arranged downstream from said reservoir having a sewage inlet connected with the sewage outlet of said reservoir, a sewage outlet and at least one inlet for chemicals;
   a closed vessel having an upper tangential inlet which is connected with the sewage outlet of said second mixing tank and which opens into an outer annular chamber, said outer chamber being open at the bottom and in communication with an inner annular chamber which is in communication with an outlet of said closed vessel, each of said outer and inner annular chambers being in communication with a third chamber positioned below said first and second annular chambers and provided with a sludge drain;
   a filter associated with said closed vessel and arranged downstream from said upper tangential inlet of said closed vessel; and
   a disinfecting means positioned downstream from said filter.

2. The system according to claim 1 wherein said closed vessel includes an outer annular chamber, a filter and a pipe connected with said disinfecting means arranged concentrically from the outside to the inside.

3. The system according to claim 1 wherein a third mixing tank is arranged downstream from the sludge drain of said closed vessel, said third mixing tank including a bottom conical end and a sludge outlet having in its central part a rotating mixing blade and in its upper part an inlet for air and an inlet for a dosage of chlorine, said system further including a feed pump and a sludge densifier arranged downstream from the sludge drain of said third mixing tank.

4. The system according to claim 1 wherein said first mixing tank has a spherical bottom.

5. The system according to claim 1 wherein said pump is of such a nature that it performs a disintegrating function when pumping.

6. The system according to claim 1 wherein said second mixing tank includes an annular cylindrical space, the upper part of which communicates tangentially with the sewage inlet of said second mixing tank and the bottom part of which has an inlet for a flocculating reagent, said second mixing tank further having a centrally located pipe connected to it having an upper outlet.

7. The system according to claim 1 having between said reservoir and said closed vessel in series three dosage devices for reagents.

8. The system according to claim 7 having the inlet of the first device between said reservoir and said second mixing tank, the inlet of the second device in the lower part of said mixing tank and the inlet of the third device between said mixing tank and said closed vessel.

* * * * *